United States Patent
Dang et al.

(10) Patent No.: US 8,891,192 B1
(45) Date of Patent: Nov. 18, 2014

(54) DISK DRIVE CALIBRATING PARAMETER BY INJECTING NOISE SIGNAL AND MEASURING OFF-TRACK READ CAPABILITY

(71) Applicant: Western Digital Technologies, Inc., Irvine, CA (US)

(72) Inventors: Dean V. Dang, Fountain Valley, CA (US); Philip Bernard Saram, Kuala Lumpur (MY); Robert S. Cohn, Newport Coast, CA (US); Donald Brunnett, Pleasanton, CA (US); Kamalam P. Elayappan, Setia Alam (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/678,495

(22) Filed: Nov. 15, 2012

(51) Int. Cl.
G11B 5/60 (2006.01)
G11B 21/10 (2006.01)

(52) U.S. Cl.
CPC .................. *G11B 21/106* (2013.01)
USPC ............... 360/75; 360/39; 360/234

(58) Field of Classification Search
USPC .......... 360/39, 55, 69, 75, 230, 234
See application file for complete search history.

(56) References Cited

U.S. PATENT DOCUMENTS

| | | | |
|---|---|---|---|
| 5,585,974 A | 12/1996 | Shrinkle | |
| 5,786,951 A | 7/1998 | Welland et al. | |
| 5,914,827 A | 6/1999 | Yamasaki et al. | |
| 6,104,557 A * | 8/2000 | Kasai et al. | 360/46 |
| 6,445,521 B1 | 9/2002 | Schaff et al. | |
| 6,680,609 B1 | 1/2004 | Fang et al. | |
| 6,731,443 B2 | 5/2004 | Bliss et al. | |
| 6,760,174 B2 | 7/2004 | Forehand | |
| 6,788,489 B1 | 9/2004 | Chang et al. | |
| 7,027,255 B2 | 4/2006 | Schmidt | |
| 7,352,525 B1 | 4/2008 | Shrestha et al. | |
| 7,436,620 B1 | 10/2008 | Kang et al. | |
| 7,502,205 B1 | 3/2009 | Hurtado et al. | |
| 7,529,050 B2 | 5/2009 | Shen et al. | |
| 7,580,216 B1 * | 8/2009 | Han et al. | 360/75 |
| 7,602,863 B2 * | 10/2009 | Kovintavewat et al. | 375/340 |
| 7,616,398 B2 | 11/2009 | Gong et al. | |
| 7,636,217 B2 | 12/2009 | Uji et al. | |
| 7,974,039 B1 | 7/2011 | Xu et al. | |
| 8,089,719 B1 * | 1/2012 | Dakroub | 360/75 |
| 8,508,876 B2 * | 8/2013 | Polley et al. | 360/39 |
| 2006/0067434 A1 | 3/2006 | Kovintavewat et al. | 375/340 |
| 2006/0121317 A1 * | 6/2006 | Kokaku et al. | 428/826 |
| 2008/0204924 A1 * | 8/2008 | Ohno et al. | 360/75 |
| 2009/0034380 A1 | 2/2009 | Ngwe et al. | |
| 2009/0213486 A1 | 8/2009 | Takahashi | |
| 2011/0249361 A1 * | 10/2011 | Mathew et al. | 360/75 |
| 2012/0050907 A1 * | 3/2012 | Haapala | 360/59 |
| 2012/0250484 A1 * | 10/2012 | Polley et al. | 369/53.39 |

\* cited by examiner

*Primary Examiner* — Thomas Alunkal

(57) ABSTRACT

A disk drive is disclosed comprising a disk comprising a plurality of tracks, and a head actuated over the disk. One of the tracks is read to generate a read signal, and a noise signal is injected into the read signal to generate a noisy read signal. An off-track read capability (OTRC) is measured based on the noisy read signal, and a parameter of the disk drive is adjusted based on the OTRC.

14 Claims, 5 Drawing Sheets

DISK DRIVE CALIBRATING PARAMETER BY INJECTING NOISE SIGNAL AND MEASURING OFF-TRACK READ CAPABILITY

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

FIG. 1 shows a prior art disk format 2 comprising a number of servo tracks 4 defined by servo sectors $6_0$-$6_N$ recorded around the circumference of each servo track, wherein data tracks are defined relative to the servo tracks. Each servo sector 6, comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector 6, further comprises groups of servo bursts 14 (e.g., A, B, C and D servo bursts), which comprise a number of consecutive transitions recorded at precise intervals and offsets with respect to a servo track centerline. The groups of servo bursts 14 provide fine head position information used for centerline tracking while accessing a data track during write/read operations.

Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator.

DETAILED DESCRIPTION

Figure 1:
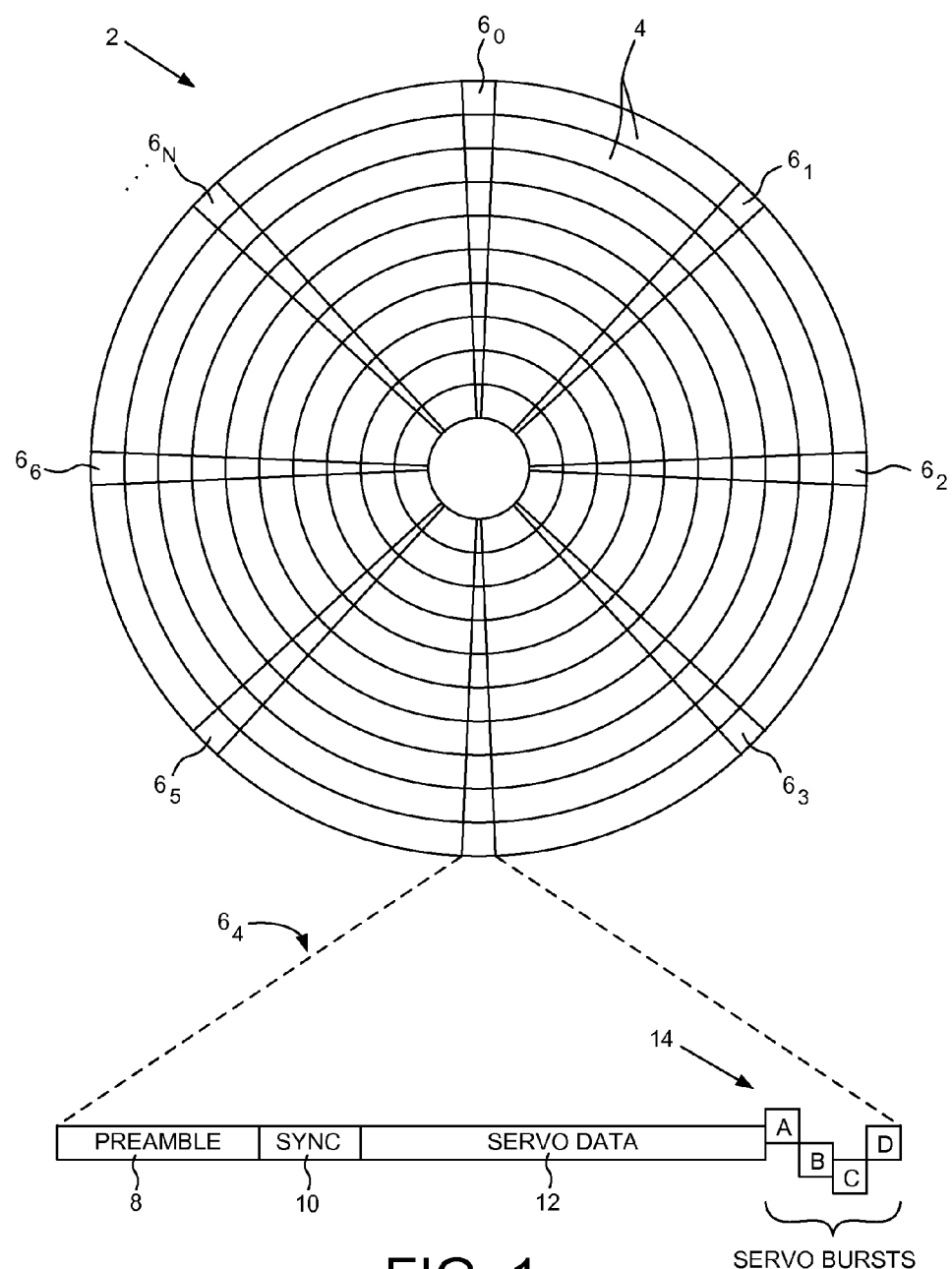
FIG. 1 shows a prior art disk format comprising a plurality of servo tracks defined by servo sectors.
Figure 2A:
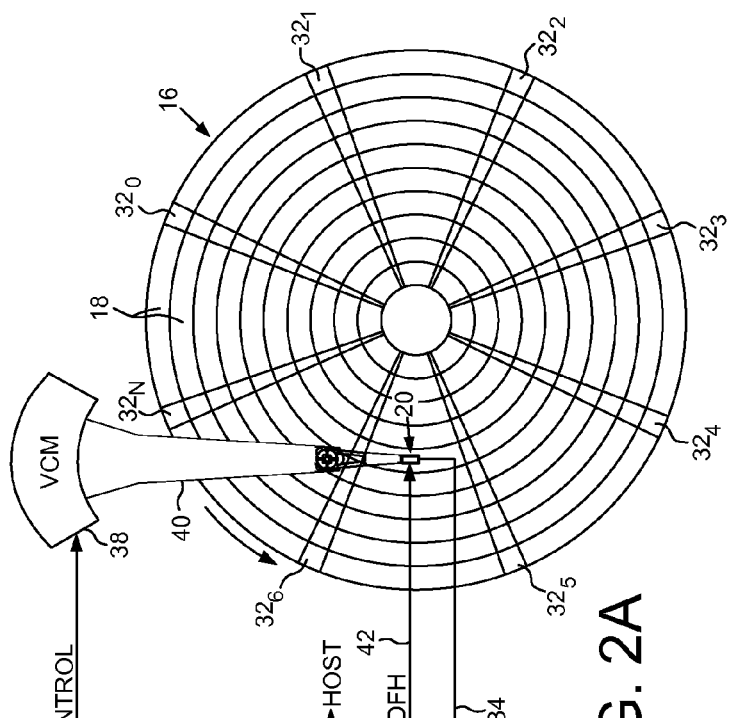
FIG. 2A shows a disk drive according to an embodiment of the present invention comprising a head actuated over a disk.
Figure 2B:
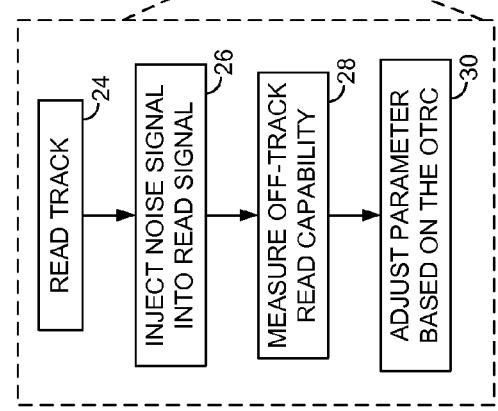
FIG. 2B is a flow diagram according to an embodiment of the present invention wherein a noise signal is injected into a read signal, an off-track read capability (OTRC) is measured based on the noisy read signal, and a parameter of the disk drive is adjusted based on the OTRC.

FIG. 2A shows a disk drive according to an embodiment of the present invention comprising a disk 16 comprising a plurality of tracks 18, and a head 20 actuated over the disk 16. The disk drive further comprises control circuitry 22 operable to execute the flow diagram of FIG. 2B wherein one of the tracks is read to generate a read signal (block 24), and a noise signal is injected into the read signal to generate a noisy read signal (block 26). An off-track read capability (OTRC) is measured based on the noisy read signal (block 28), and a parameter of the disk drive is adjusted based on the OTRC (block 30).

In the embodiment of FIG. 2A, the disk 16 comprises embedded servo sectors $32_0$-$32_N$ that define a plurality of servo tracks, wherein data tracks are defined relative to the servo tracks (at the same or different radial density). The control circuitry 22 processes a read signal 34 emanating from the head 20 to demodulate the servo sectors $32_0$-$32_N$ into an estimated position. The estimated position is subtracted from a reference position to generate a position error signal (PES) representing an error between the actual position of the head and a target position relative to a target track. The PES is filtered using a suitable compensation filter to generate a control signal 36 applied to a voice coil motor (VCM) 38 which rotates an actuator arm 40 about a pivot in order to actuate the head 20 radially over the disk 16 in a direction that reduces the PES. The servo sectors $32_0$-$32_N$ may comprise any suitable position information, such as a track address for coarse positioning and servo bursts for fine positioning. The servo bursts may comprise any suitable pattern, such as an amplitude-based servo pattern (e.g., a quadrature servo pattern), or a suitable phase-based servo pattern.

In one embodiment, the head 20 may comprise a suitable fly height actuator, such as a heater or a piezoelectric actuator, operable to actuate the head vertically over the disk in order to maintain a target fly height. The control circuitry 22 may comprise a servo control system operable to compare a measured fly height to a target fly height to generate a fly height error used to generate a dynamic fly height (DFH) control signal 42 (FIG. 2A) similar to the servo control system that controls the radial position of the head 20. In other embodiments, the fly height of the head 20 may be controlled open-loop by calibrating a static fly height control signal that achieves a nominal fly height.

Figure 2C:
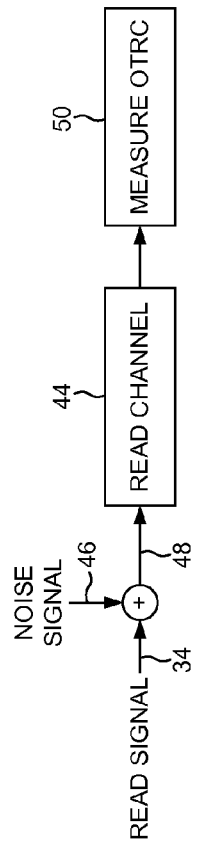
FIG. 2C shows an embodiment of the present invention wherein a noise signal is injected into a read signal to generate a noisy read signal demodulated by a read channel.

FIG. 2C shows an embodiment of the present invention wherein the control circuitry 22 comprises a read channel 44 for demodulating data from a noisy read signal 48 generated by injecting a noise signal 46 into the read signal 34 emanating from the head 20. The noise signal 46 may be injected into the read signal 34 in any suitable manner. For example, in one embodiment the noise signal 46 may be added to the read signal 34 as either an analog signal using any suitable analog noise signal generator, or added to the read signal 34 as a digital signal using any suitable digital noise signal generator. In the embodiment shown in FIG. 2C, the control circuitry 22 further comprises suitable circuitry 50 for measuring the OTRC, such as a suitable microprocessor.

Any suitable OTRC may be measured in the embodiments of the present invention. In one embodiment, the control circuitry 22 writes a known test pattern to the disk, and then reads the known test pattern in order to measure a suitable OTRC. For example, a suitable OTRC may measure the bit error rate of the data detected from the noisy read signal 48. Other suitable OTRC metrics may include read channel metrics, such as a variable gain amplifier setting, or a detector branch metric, or a decoder quality metric (e.g., a log-likelihood ratio), etc.

Figure 2D:
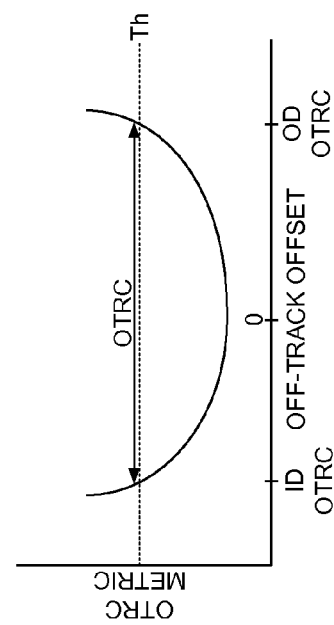
FIG. 2D is a graph illustrating an example OTRC according to an embodiment of the present invention.

Whatever the OTRC metric employed, the OTRC is generated by measuring the OTRC metric at various radial offsets from the center of the target track. An example OTRC is illustrated in FIG. 2D which shows a bathtub curve for an OTRC metric relative to different off-track offsets for the head. The OTRC is minimum at zero off-track offset where the signal-to-noise ratio (SNR) of the read signal is highest. As the off-track offset increases in either direction (toward the inner diameter (ID) or outer diameter (OD)), the OTRC metric increases (e.g., bit error rate increases). In one embodiment, the OTRC is determined relative to when the OTRC metric exceeds a threshold, wherein the OTRC is defined as the width of the off-track offset between the corresponding ID and OD off-track offsets where the threshold is reached as illustrated in FIG. 2D. In other embodiments, the OTRC curve may be inverted such that the OTRC metric decreases as the off-track offset increases in either direction (i.e., the curve shown in FIG. 2D may be inverted).

Figure 3A:
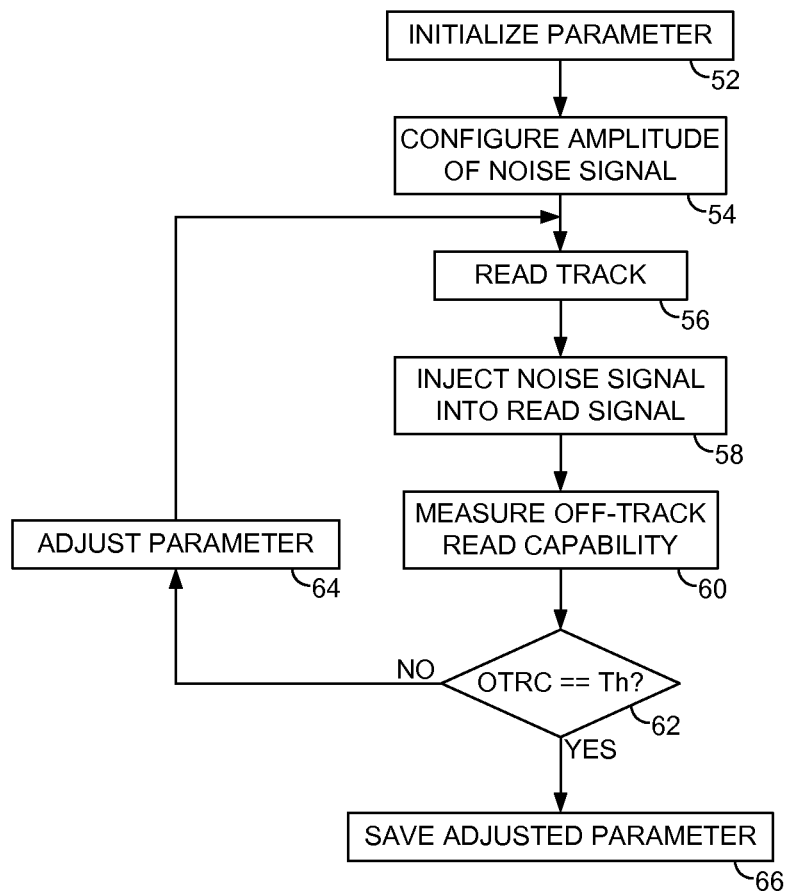
FIG. 3A is a flow diagram according to an embodiment of the present invention wherein a parameter of the disk drive is adjusted until the OTRC reaches a predetermined threshold.
Figure 3B:
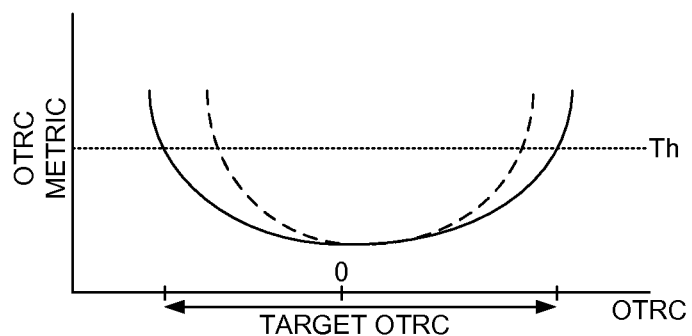
FIG. 3B is a graph illustrating an example OTRC for two different parameter settings according to an embodiment of the present invention.

FIG. 3B is a flow diagram according to an embodiment of the present invention for calibrating a parameter of the disk drive based on the OTRC. The parameter of the disk drive is initialized (block 52), and an amplitude of the noise signal 46 (FIG. 2C) is configured to a desired level (block 54). One of the tracks is read to generate a read signal (block 56), and the noise signal is injected into the read signal to generate a noisy read signal (block 58). An OTRC is measured based on the noisy read signal (block 60). If the OTRC has not reached a target threshold (block 62), the parameter of the disk drive is adjusted (block 64). The flow diagram is then repeated starting from step 56 until the OTRC reaches the target threshold at block 62. The parameter setting that causes the OTRC to reach the target threshold is then saved for use during normal operation (block 66). FIG. 3B illustrates graphically the flow diagram of FIG. 3A wherein the OTRC for the initial parameter setting may be represented as the dashed curve, and the parameter is adjusted until the OTRC reaches the target threshold as represented by the solid curve.

Figure 4A:
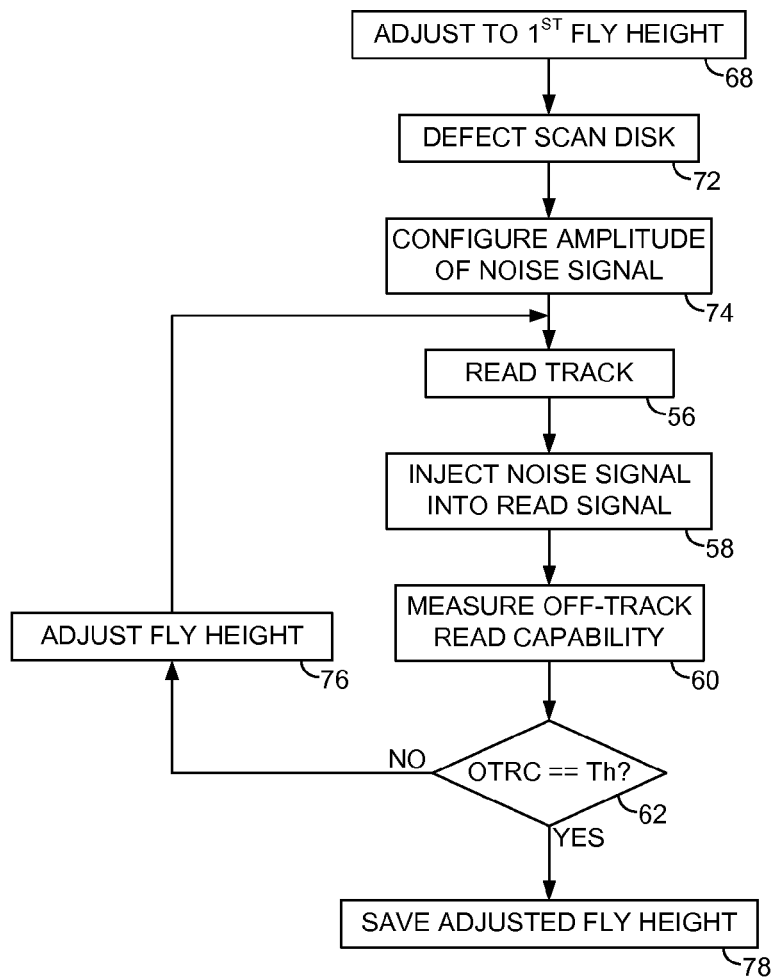
FIG. 4A is a flow diagram according to an embodiment of the present invention wherein the parameter adjusted based on the OTRC comprises a fly height of the head.
Figure 4B:
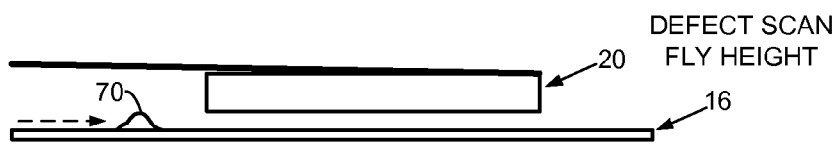
FIGS. 4B and 4C shows an embodiment of the present invention wherein a first fly height is used to execute a defect scan of the disk, and a second, higher fly height is used during normal read operations.
Figure 4C:
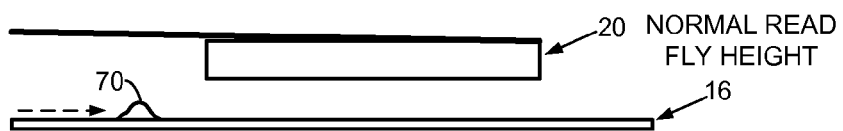

Any suitable parameter of the disk drive may be calibrated based on the OTRC, such as any suitable parameter in the read channel 44. In one embodiment, the parameter of the disk drive comprises a fly height of the head 20 over the disk 16, and in an embodiment understood with reference to the flow diagram of FIG. 4A, the fly height of the head 20 is calibrated based on the OTRC after performing a defect scan of the disk 16 to detect defects such as thermal asperities. The head is adjusted to a first fly height (block 68), wherein in one embodiment the first fly height is lower than a normal operating fly height as illustrated in FIGS. 4B and 4C. The lower fly height during the defect scan helps ensure the defects are accurately detected, such as a thermal asperity 70. After performing the defect scan (block 72), the amplitude of the noise signal 46 is configured (block 74) and the fly height is adjusted (block 76) until the OTRC reaches the target threshold (block 62). The adjusted fly height that generates the target OTRC is then saved for use during normal read operations (block 78). In one embodiment, the flow diagram of FIG. 4A may be repeated using a different amplitude noise signal in order to calibrate the fly height for use during normal write operations (which may be different than that used for read operations).

Figure 5:
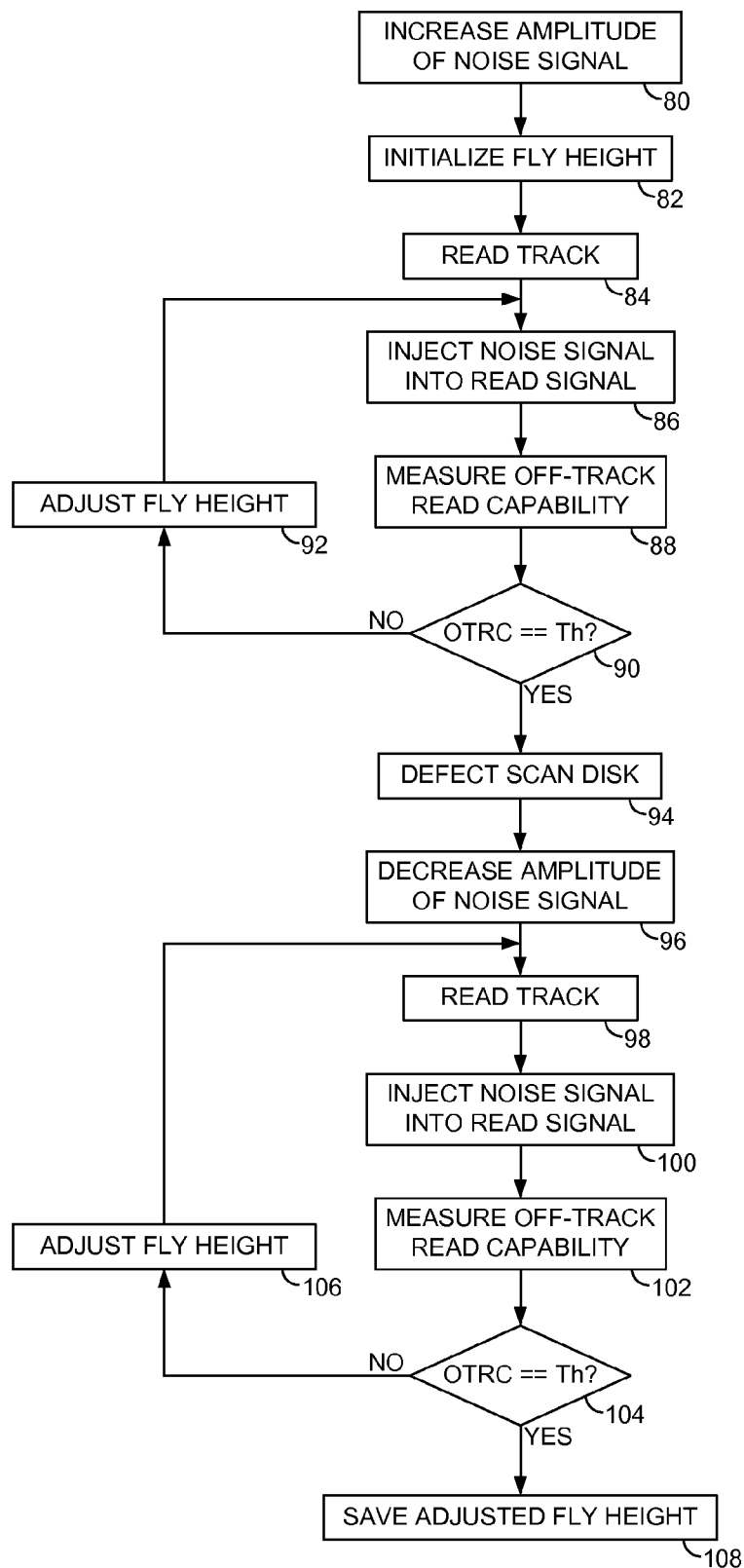
FIG. 5 is a flow diagram according to an embodiment of the present invention wherein the amplitude of the noise signal is increased to calibrate the defect scan fly height based on the OTRC, and then the amplitude of the noise signal is decreased to calibrate the normal operating fly height based on the OTRC.

FIG. 5 is a flow diagram according to an embodiment of the present invention for calibrating the fly height of the head prior to performing the defect scan of the disk, and after performing the defect scan of the disk. In this embodiment, in order to achieve a lower flying height during the defect scan, the amplitude of the noise signal is increased (block 80). Since the signal power increases at lower fly heights, increasing the amplitude of the noise signal causes a lower fly height when calibrating based on the OTRC. That is, a lower fly height is required to reach the target OTRC when the amplitude of the noise signal is increased. Accordingly, the fly height is initialized (block 82), the track is read to generate the read signal (block 84), the noise signal is injected into the read signal (block 86), and the OTRC is measured (block 88) and compared to a target threshold (block 90). The fly height is adjusted (block 92) and the flow diagram repeated until the fly height causes the OTRC to reach the target threshold at block 90. The disk is then scanned for defects (block 94) using the lower fly height (FIG. 4B) that was calibrated based on the higher amplitude noise signal.

The amplitude of the noise signal is then decreased (block 96) and the fly height calibrated to achieve the target OTRC. Lowering the amplitude of the read signal results in a higher fly height since less signal power is needed to achieve the target OTRC. The track is read to generate the read signal (block 98), the noise signal is injected into the read signal (block 100), and the OTRC is measured (block 102) and compared to a target threshold (block 104). The fly height is adjusted (block 106) and the flow diagram repeated until the fly height causes the OTRC to reach the target threshold at block 104. The final fly height setting is then saved (block 108) and used for normal read operations as shown in FIG. 4C.

In the embodiments of the present invention, the adjustment to the parameter at block 64 of FIG. 3A (e.g., the adjustment to the fly height) may be made so that the OTRC rises toward, or falls toward, the target threshold at block 62. That is, the parameter may be initialized at block 52 to a setting that ensures the OTRC will start below or above the target threshold at block 62. The parameter may then be adjusted at block 64 by increasing or decreasing the setting to cause the OTRC to move toward the target threshold at block 62.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising a plurality of tracks;
a head actuated over the disk; and
control circuitry operable to:
read a target track to generate a read signal;
inject a noise signal into the read signal to generate a noisy read signal;
measure an off-track read capability (OTRC) based on the noisy read signal by measuring an OTRC metric at a plurality of radial offsets for the head relative to a center of the target track; and
adjust a parameter of the disk drive based on the OTRC.

2. The disk drive as recited in claim 1, wherein the control circuitry is further operable to:
configure an amplitude of the noise signal to a target amplitude; and
after configuring the amplitude of the noise signal, adjust the parameter of the disk drive until the OTRC reaches a target threshold.

3. The disk drive as recited in claim 2, wherein the parameter of the disk drive comprises a fly height of the head.

4. The disk drive as recited in claim 3, wherein the control circuitry is further operable to:
scan for defects on the disk while the head is operating based on a first fly height; and
after scanning for defects, adjust the fly height until the OTRC reaches the target threshold.

5. The disk drive as recited in claim 4, wherein the adjusted fly height is higher than the first fly height to reduce a probability of the head contacting an asperity on the disk during a normal read operation of the disk drive.

6. The disk drive as recited in claim 4, wherein prior to defect scanning the disk the control circuitry is further operable to calibrate the first fly height by:
increasing the amplitude of the noise signal; and
adjusting the fly height until the OTRC reaches the target threshold.

7. The disk drive as recited in claim 6, wherein after scanning for defects the control circuitry is further operable to:
decrease the amplitude of the noise signal; and
adjust the fly height until the OTRC reaches the target threshold.

8. A method of operating a disk drive, the disk drive comprising a disk comprising a plurality of tracks, and a head actuated over the disk, the method comprising:
reading a target track to generate a read signal;
injecting a noise signal into the read signal to generate a noisy read signal;
measuring an off-track read capability (OTRC) based on the noisy read signal by measuring an OTRC metric at a plurality of radial offsets for the head relative to a center of the target track; and
adjusting a parameter of the disk drive based on the OTRC.

9. The method as recited in claim 8, further comprising:
configuring an amplitude of the noise signal to a target amplitude; and
after configuring the amplitude of the noise signal, adjusting the parameter of the disk drive until the OTRC reaches a target threshold.

10. The method as recited in claim 9, wherein the parameter of the disk drive comprises a fly height of the head.

11. The method as recited in claim 10, further comprising:
scanning for defects on the disk while the head is operating based on a first fly height; and
after scanning for defects, adjusting the fly height until the OTRC reaches the target threshold.

12. The method as recited in claim 11, wherein the adjusted fly height is higher than the first fly height to reduce a probability of the head contacting an asperity on the disk during a normal read operation of the disk drive.

13. The method as recited in claim 11, wherein prior to defect scanning the disk the method further comprises calibrating the first fly height by:
increasing the amplitude of the noise signal; and
adjusting the fly height until the OTRC reaches the target threshold.

14. The method as recited in claim 13, wherein after scanning for defects the method further comprising:
decreasing the amplitude of the noise signal; and
adjusting the fly height until the OTRC reaches the target threshold.

* * * * *